United States Patent [19]

Akai et al.

[11] 3,902,860

[45] Sept. 2, 1975

[54] THERMAL TREATMENT OF SEMICONDUCTING COMPOUNDS HAVING ONE OR MORE VOLATILE COMPONENTS

[75] Inventors: Shin-ichi Akai; Katsunosuke Aoyagi; Yasushi Hirata, all of Osaka, Japan

[73] Assignee: Sumitomo Electric Industries, Ltd., Osaka, Japan

[22] Filed: Sept. 26, 1973

[21] Appl. No.: 400,934

[52] U.S. Cl............................ 23/301 SP; 23/273 SP
[51] Int. Cl............................ B01d 9/00; B01j 17/20
[58] Field of Search..................... 23/301 SP, 273 SP

[56] References Cited
UNITED STATES PATENTS

| 3,077,384 | 2/1963 | Enk et al. | 23/273 SP |
|---|---|---|---|
| 3,401,023 | 9/1968 | Mullin | 23/301 SP |
| 3,488,157 | 1/1970 | Koffer | 23/273 SP |
| 3,507,625 | 4/1970 | Deyris | 23/301 SP |
| 3,556,132 | 1/1971 | Chang et al. | 23/301 SP |
| 3,627,499 | 12/1971 | LeDuc et al. | 23/301 SP |
| 3,649,193 | 3/1972 | Deyris | 23/273 SP |
| 3,741,817 | 6/1973 | Bienert et al. | 23/301 SP |

Primary Examiner—Norman Yudkoff
Assistant Examiner—D. Sanders
Attorney, Agent, or Firm—Carothers and Carothers

[57] ABSTRACT

A semiconducting compound having a volatile component is thermally treated in an atmosphere of the volatile component in an enclosed chamber, or a crystal of said semiconducting compound is grown by crystallization from a melt of said semiconducting compound which is contacted with a vapor of said volatile component generated in the enclosed chamber. The enclosed chamber has at least one diffusion barrier which is composed of a liquid layer on a porous wall, the liquid being selected from liquids having a low vapor pressure and being hardly capable of dissolving said volatile component therein. The enclosed chamber is connected with an outer chamber only through the barrier wall, and the vapor pressure of said volatile component in the enclosed chamber and the pressure of a gas in the outer chamber are automatically balanced.

18 Claims, 6 Drawing Figures

THERMAL TREATMENT OF SEMICONDUCTING COMPOUNDS HAVING ONE OR MORE VOLATILE COMPONENTS

BACKGROUND OF THE INVENTION

1. Field of the Invention

This invention relates to a method for the thermal treatment of a semiconducting compound having a volatile component in an atmosphere of said volatile component. More particularly, the invention relates to a method for growing a crystal of such a semiconducting compound by crystallization from a melt or solution containing said semiconducting compound, which is always contacted with a vapor of said volatile component. The invention relates further to a method for preparing such semiconducting compounds by employing as raw materials, constituents of said semiconducting compound, polycrystals of said semiconducting compounds or both of these constituents and polycrystals of said semiconducting compound, in which a sealed reaction tube system is not used but a demountable and reusable crucible or apparatus is used.

As important semiconducting materials used in the electronics industry, the following are examples: III–V semiconducting compounds and III–V mixed crystals such as GaAs, GaP, InAs, InP, AlAs, AlP, $Ga_{1-x}In_xP$, $Al_{1-x}Ga_xAs$, $Al_{1-x}In_xAs$, $Al_{1-x}Ga_xP$, $Al_{1-x}In_xP$, $GaAs_{1-x}P_x$ and $InAs_{1-x}P_x$ (in which $x$ is within a range of $0 < x < 1$); II–VI semiconducting compounds such as ZnS and ZnSe; and $CuAlS_2$ and $AgGaS_2$, etc.

Since each of these semiconducting compounds has a very high dissociation pressure at the melting point thereof, it is very difficult to synthesize such semiconducting compounds directly from constituents thereof without the use of a sealed reaction tube system and to control the vapor pressure of a volatile component of such semiconducting compounds at a high degree of accuracy.

DESCRIPTION OF THE PRIOR ART

We previously proposed a method for producing a semiconducting compound having a high dissociation pressure, such as GaP, InP and $Ga_{1-x}In_xP$ (in which $x$ is within a range of $0 < x < 1$) without the use of a sealed reaction tube system while controlling the vapor pressure of a volatile component contained therein (U.S. Patent Application Ser. No. 166,506 filed on July 27, 1971). According to this method, for instance, a melt of Ga is placed in a crucible having a porous bottom wall, the melt surface is covered with a layer of an inert liquid less dense than said compound, red phosphorus is placed in a low temperature room connected directly with said crucible through said porous bottom wall, the low temperature room is heated to dissolve a vapor of phosphorus in the melt in the crucible which is heated and maintained at a high temperature, and thus a melt of GaP is synthesized from Ga and P. In this method, the vapor pressure is controlled by balancing the vapor pressure of the volatile component in the low temperature room with the pressure of an inert gas in an outer pressure chamber which houses the crucible and the low temperature room entirely. Furthermore, in this proposal, an embodiment is disclosed in which this pressure balancing is accomplished by the provision of a capillary access connecting the low temperature room with the outer pressure chamber. However, this method is defective in that a minute amount of the volatile component is lost by diffusion through said capillary access. Further, although $B_2O_3$ is generally preferably used as an inert liquid in this method, no suitable inert liquid is present for AlAs which reacts with $B_2O_3$ and for ZnS which is slightly dissolved into the $B_2O_3$. Accordingly, this method cannot be applied effectively to such compounds.

As another prior pressure-balancing technique, there can be exemplified a method proposed by J. B. Mullin et al. in "Pressure Balancing: A Technique for Suppressing Dissociation during the Melt-Growth of Compounds" published in the Journal of Crystal Growth, 13/14 (1972), pp. 629–634. According to this method, in case InAs is prepared by the melt-growth, In and As are placed in an enclosed chamber, it is set in an outer main chamber, and the vapor pressure of arsenic in the enclosed chamber is balanced with the pressure of an inert gas in the outer main chamber. J. B. Mullin et al. propose two specific methods for such pressure balancing. According to one method, the pressure of the inert gas in the outer main chamber is regulated depending on the variation in the vapor pressure of arsenic in the enclosed chamber. According to the other method, the $B_2O_3$ melt is combined with a pressure balancing bubbler which is a kind of capillary device.

According to the former method, it is very difficult to perform the pressure regulation at a high accuracy when the compound has a high dissociation pressure, such as GaP, which has a dissociation pressure of 35 atmospheres. In the latter method, it is necessary to design a bubbler to standards dependent upon the pressure level so that the bubbler has an optimum configuration relative to the actual pressure. The principle of the latter method is the same as that of the method previously proposed by Chicotka et al.

In "Synthesis and Crystal Growth of Mixed III-V-V Compounds" published in IBM Technical Disclosure Bulletin, Vol. 13, No. 1, June 1970, pp. 75–76, R. J. Chicotka and J. M. Woodall propose a method for synthesizing $GaAs_{1-x}P_x$ $(0 < x < 1)$ with the use of a sealed reaction tube system. According to this method, a Ga chamber, an As chamber and a P chamber are provided in a reaction tube, a $B_2O_3$ layer is disposed between the As chamber and the P chamber, and phosphorus vapor is bubbled through the molten $B_2O_3$ layer through a tube which is a kind of a capillary, whereby the pressure in the As chamber is made equal to the pressure in the P chamber and the pressure balancing is established. However, this method has a drawback, which is the same as involved in the second method proposed by Mullin et al. More specifically, if the tube (bubbler in the proposal of Mullin et al.) is not appropriately designed, there is an apprehension that the $B_2O_3$ melt passes through the tube and is flowed into the P chamber (enclosed chamber in the proposal of Mullin et al).

SUMMARY OF THE INVENTION

This invention provides an improvement in pressure balancing in the thermal treatment of semiconducting compounds which have one or more volatile components.

In accordance with the teachings of this invention, a method is provided for the thermal treatment of a semiconducting compound having at least one volatile component or a method for crystallizing it from a melt of the compound or a solution containing the compound, said compound melt or solution being contacted with a vapor of said volatile component which is generated in an enclosed chamber, wherein said enclosed chamber has at least one diffusion-barrier wall which is composed of a liquid layer on a porous wall, said liquid is selected from liquids having a low vapor pressure at the temperature of the barrier wall and being hardly capable of dissolving said volatile component therein, and wherein said enclosed chamber is connected with an outer chamber only through the barrier wall so that the vapor pressure of the volatile component in the enclosed chamber and the pressure of a gas in the outer chamber are automatically balanced. What is meant by liquids having a low vapor pressure at the temperature of the barrier is a vapor pressure sufficiently low to prevent undue vaporization of the liquid portion of the barrier such as non-volatile and non-dissociable liquids.

It is a primary object of this invention to provide an improvement in the method for thermally treating a semiconducting compound having a volatile component in an atmosphere of a vapor of said volatile component, for instance, a method for diffusing such an impurity as Zn into a wafer of a single crystal of the $n$-type GaP in a vapor of phosphorus.

Another object of this invention is to provide a novel improved method for preparing a semiconducting compound from constituents or polycrystals of said semiconducting compound or from constituents and polycrystals of said semiconducting compound, wherein a sealed reaction tube system is not used by a demountable and reusable crucible or apparatus is used.

Still another object of this invention is to provide a method for preparing a single crystal of a semiconducting compound such as GaP by crystallizing it from a stoichiometric melt thereof, wherein though the vapor pressure of the volatile component of the semiconducting compound is as high as about 40 atmospheres, the synthesis can be accomplished safely and easily without destruction of a crucible used for the synthesis.

Another object of this invention is to provide a method for preparing a semiconducting compound having a volatile component and containing an active aluminum component, such as AlAs and $Ga_{1-x}Al_xAs$ ($x$ is within a range of $0 < x < 1$), by employing a demountable and reusable crucible or apparatus.

Another object of this invention is to provide a novel direct-synthesis Czochralski method, namely, a method according to which the synthesis of a semiconducting compound from the constituents thereof and the pulling of a single crystal of said semiconducting compound can be accomplished by one step.

Still another object of this invention is to provide a method for preparing a III–V mixed crystal having a formula $A^{III}B^V_{1-x}C^V_x$ in which $A^{III}$ stands for an element belonging to the Group III, $x$ is a number between 0 and 1, $B^V$ and $C^V$ are different elements belonging to the Group V, with the proviso that $C^V$ is more volatile than $B^V$, by controlling the pressures of the $B^V$ and $C^V$ components independently.

BRIEF DESCRIPTION OF THE DRAWINGS

Other objects and advantages of this invention will, in part, be obvious, and will, in part, appear hereinafter.

Accordingly, the improvement in pressure balancing techniques according to this invention can be applied to not only the Czochralski process, but also to the horizontal Bridgman process, the vertical Bridgman process, the gradient freeze process, the zone melting process, the Czochralski process starting from a non-stoichiometric melt, and other known processes for the preparation of semiconducting compounds.

The foregoing and other objects, features and advantages will be apparent from the following more particular description made on the preferred embodiments by reference to the accompanying drawings.

DETAILED DESCRIPTION

This invention will now be described in more detail with reference to Examples. Although preparation of crystals of GaP, GaAs and $GaAs_{1-x}P_x$ (in which $x$ is within the range of $0 < x < 1$) is illustrated in these Examples, it is obvious to those skilled in the art, this invention can be applied to the preparation of other various semiconducting compounds having a volatile component, such as exemplified hereinbefore.

EXAMPLE 1

Figure 1:
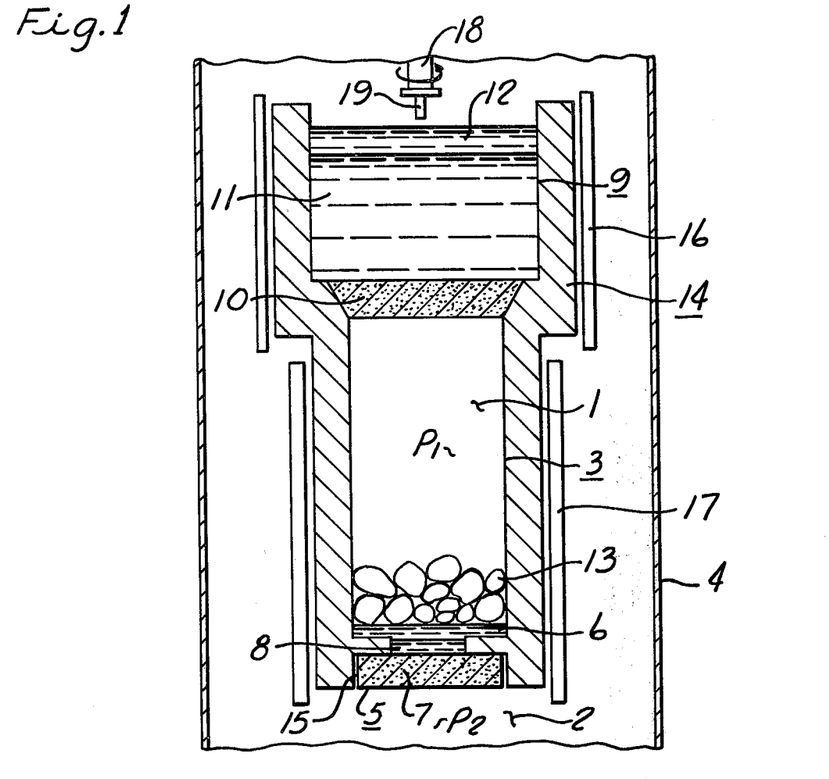
FIG. 1 is a diagrammatic view showing the vertical section of an apparatus for growing a single crystal of GaP, which is used for the practice of one embodiment of this invention.

FIG. 1 illustrates a vertical section of a crucible and a high pressure chamber to be used for the practice of one embodiment of this invention, in which the pressure-balancing method of this invention is applied to our previously proposed synthesis process (U.S. Patent Application Ser. No. 166,506).

In this embodiment, it is required that pressures of a phosphorus vapor 1 and an inert gas 2 should be automatically balanced.

In FIG. 1, a low temperature chamber 3 (enclosed chamber) filled with phosphorus vapor 1 is partitioned from a high pressure chamber 4 (outer chamber) by a diffusion-barrier wall 5 composed of a layer 6 of a melt of $B_2O_3$ having a low phosphorus solubility and a layer 7 of porous carbon and a Ga melt layer 8. A crucible apparatus 14 is provided with the low temperature chamber 3 and a high temperature chamber 9 which are heated by heating elements 17 and 16, respectively. Both chambers 3 and 9 are separated from each other by means of a bottom wall or barrier 10 composed of porous carbon. A GaP melt 11 is formed in the high pressure chamber 9, and the surface of the melt 11 is covered with a layer 12 of a $B_2O_3$ melt. The composition of the GaP melt 11 is controlled by phosphorus vapor 1 generated from red phosphorus 13 placed in the low temperature chamber. In regard to materials to be used for diffusion-barrier walls 6, 7 and 8, $B_2O_3$, $BaF_2$, low melting point glass, Ga and the like can be used as liquid layers 6 and 8 disposed on the low temperature chamber, namely the enclosed chamber, where the vapor of phosphorus is generated, and carbon, sintered BN, $Al_2O_3$ and porous quartz can be used as a porous layer 7 of the diffusion-barrier wall 5. A sheet prepared by sandwiching carbon fibers with carbon plates having a great number of pores can also be used as the porous layer 7.

The Ga melt layer 8 in the diffusion-barrier wall 5 is used when there is a fear that the $B_2O_3$ melt layer 6 will react with the porous layer 7. In case the layer 7 is composed of porous carbon, provision of the Ga melt layer 8 should not always be necessary, but when $Al_2O_3$ is employed instead of porous carbon, provision of the Ga melt layer 8 is indispensable. Reference number 15 indicates a thread cutting.

When the pressure $P_1$ of the phosphorus vapor 1 is higher than the pressure $P_2$ of an inert gas such as, for example, nitrogen and argon, a part of the phosphorus vapor 1 corresponding to $\Delta P = P_1 - P_2$ passes through the porous bottom wall 10 and GaP melt 11 and $B_2O_3$ melt 12 while causing bubbling, and is discharged into the high pressure chamber 4 (outer chamber), whereby the condition of $P_1 \approx P_2$ is automatically satisfied.

On the other hand, when the phosphorus pressure is decreased and the pressure $P_1$ of phosphorus is lower than the pressure of the inert gas, the inert gas passes through the porous layer 7 of the barrier wall 5 disposed on the bottom of the low temperature chamber and through the Ga melt layer 8 and $B_2O_3$ melt layer 6 while bubbling these melt layers, and is introduced from the high pressure chamber 4 (outer chamber) into the low temperature chamber 3 (enclosed chamber). When $P_2$ is substantially equal to $P_1$, the bubbling is stopped.

As seen from the foregoing explanation, when the $B_2O_3$ melt layer is combined with the porous layer as shown in FIG. 1, a gas having a low solubility in $B_2O_3$ can move from the side of the porous layer toward the $B_2O_3$ melt layer, but it cannot move in the reverse direction.

After the vapor pressure of phosphorus in the enclosed chamber 3 is thus balanced with the pressure of the inert gas in the outer chamber 4, a seed crystal 19 attached to a seed chuck 18 is lowered to have a contact with the melt of GaP and it is then pulled at a rate of about 5 to about 20 mm/hr, whereby a single crystal of GaP is grown very easily. Of course, the apparatus 14 can be used repeatedly.

Figure 2:
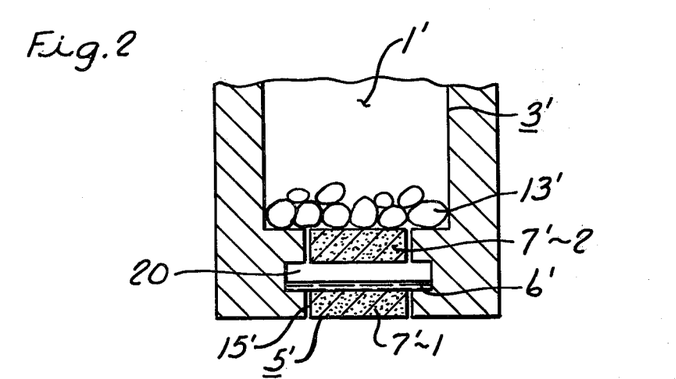
FIG. 2 is a diagrammatic view showing the vertical section of a part of the bottom barrier wall of a structure improved over the barrier wall shown in FIG. 1.

FIG. 2 is a view showing a vertical section of a part of the bottom barrier 5, which has a structure improved over the barrier wall shown in FIG. 1.

Members 1', 3', 5', 6', 7', 13' and 15' shown in FIG. 2 correspond to members 1, 3, 5, 6, 7, 13 and 15 of FIG. 1, respectively. Porous layers 7'-1 and 7'-2 are mounted on both sides of the diffusion-barrier wall 5', and a $B_2O_3$ melt layer 6' and a small space 20 are disposed between said layers 7'-1 and 7'-2.

Since this structure is advantageous in that red phosphorus 13' has no direct contact with the $B_2O_3$ melt 6', it is possible to heat the $B_2O_3$ melt 6' by means of an internal heater (not shown), according to need. In such a case, since the temperature of the $B_2O_3$ melt 6' is higher than the temperature of red phosphorus 13', an advantage is attained in that phosphorus is not condensed on the surface of the $B_2O_3$ melt.

As described above, according to the pressure-balancing method of this invention, the difference of the gas pressure between two places can be automatically reduced substantially to zero by separating these two spaces from each other by provision of a layer of a liquid having a low gas solubility and a layer composed of a porous material. This is one of the advantages of the present invention.

In the conventional horizontal Bridgman process or zone melting process for the preparation of GaAs employing a sealed tube of quartz, when the structure of this invention, namely one utilizing a wall comprising a layer of a liquid having a low solubility of a gas such as As and a layer composed of a porous material, is mounted on a part of the wall of such a sealed quartz tube and the entire sealed quartz tube is placed in an atmosphere of an inert gas, pressures of the As gas and inert gas can be automatically balanced. Therefore, sealing of a quartz tube by an oxygen-hydrogen burner need not be effected and quartz can be used repeatedly. Accordingly, the operation can be facilitated and the manufacturing cost can be reduced.

EXAMPLE 2

This Example illustrates the synthesis of GaP from Ga and P.

Figure 3:
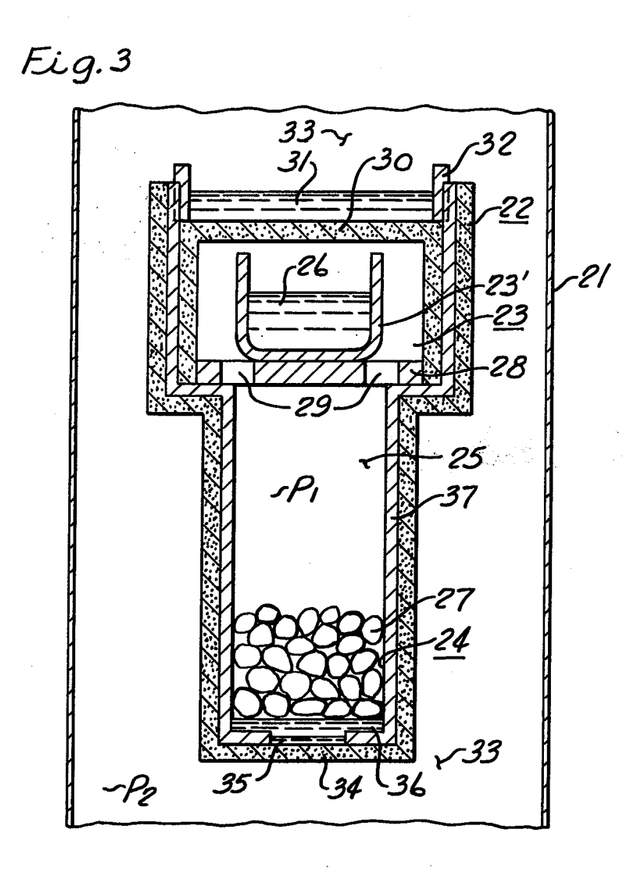
FIG. 3 is a diagrammatic view illustrating the vertical section of an apparatus for synthesizing a polycrystal of GaP, which is used for the practice of another embodiment of this invention.

FIG. 3 is a diagrammatic view showing the vertical section of an apparatus for synthesizing a polycrystal of GaP, which is used in this Example.

In FIG. 3, the synthesis apparatus 22 is placed in a high pressure chamber 21 (resisting 100 atmospheres). The apparatus 22 comprises in an enclosed chamber 25 a melting crucible 23' located in a high temperature chamber 23, and a low temperature chamber 24. Ga 26 is charged in the crucible 23' and red phosphorus 27 is contained in the low temperature chamber 24. A high temperature heater and a low temperature heater (not shown) are provided to heat the high temperature chamber 23 and low temperature chamber 24, respectively. A melting crucible stand 28 has slits 29. In the upper portion of the high temperature chamber, there are disposed a diffusion-barrier wall composed of a porous partition wall 30 and a $B_2O_3$ layer 31 and a press ring 32 to form a boundary between the high temperature chamber 23 and outer chamber 33. In the lower portion of the apparatus 22, a boundary from the outer chamber 33 is formed by a porous wall 34, a Ga layer 35 and a $B_2O_3$ layer 36.

The apparatus 22 is placed in the high pressure chamber 21, and evacuation is effected to form a vacuum in the chamber 21. By this operation, the pressure is reduced to about $10^{-3}$ mmHg in both the enclosed chamber 25 and the outer chamber 33. Then, an inert gas such as argon gas or nitrogen gas is gradually introduced into the outer chamber 33 until the pressure is elevated to about 40 atmospheres. Since the $B_2O_3$ layer 36 and Ga layer 35 are still in the unmolten state, the inert gas is introduced also into the enclosed chamber 25. Then, the Ga layer 35 and the $B_2O_3$ layer 31 are made molten by means of a heater, and Ga 26 in the high temperature chamber is heated to about 1500°C. Then, also the low temperature chamber is heated.

Thus, the $B_2O_3$ layer 36 is made fluid and the phosphorus begins evaporation. Then, the phosphorus vapor is dissolved in Ga 26, and when the temperature of phosphorus 27 reaches about 590°C, the stoichiometric melt of GaP is formed in the melt crucible 23'. During this temperature-elevating step, the pressure $P_1$ in the enclosed chamber is made higher than the pressure $P_2$ in the outer chamber. However, since parts of the phosphorus vapor and the inert gas corresponding to $\Delta P_1 = P_1 - P_2$ pass through the porous layer 30 and through the $B_2O_3$ melt layer 31 while causing bubbling, they are discharged into the outer chamber 33, whereby the pressure-balancing can be very easily accomplished. When the pressure $P_2$ is fixed to a desired level, the pressure $P_1$ in the enclosed chamber can be readily adjusted to a level equal to the pressure $P_2$. If the temperature of the high temperature chamber is lowered below 1467°C after the GaP melt has been synthesized (5 to 20 minutes from the initiation of the temperature elevation), a crystal of GaP can easily be obtained. A suitable rate of cooling of the high temperature chamber 23 is 50° to 200°C/hr. When the switch of the heater is turned off, the pressure in the enclosed chamber is lowered; but since the inert gas is flowed in from the wall 34 while the Ga layer 35 and $B_2O_3$ layer 36 are in the liquid state, the pressure balancing can also be established, and therefore the apparatus 22 is prevented from being broken. An inner vessel 37 of the apparatus 22 should be composed of a phosphorus gas-impermeable material.

In this Example, 300 to 500 g. of a polycrystal of GaP can be synthesized. If the pressure is adjusted to a level lower than the equilibrium phosphorus vapor pressure with respect to the stoichiometric melt (about 35 atmospheres), deviation from the stoichiometry can be controlled. In this case, if a temperature gradient is formed in a Ga-excessive solution 26 so that the temperature is higher at a higher part and is lower at a lower part, GaP is synthesized successively on the surface of the solution and it diffuses to the bottom of the crucible 23, and the GaP crystal can be grown there. Of course, the apparatus 22 is demountable and can be used repeatedly.

EXAMPLE 3

This Example illustrates the direct synthesis and the growth of a single crystal of GaAs by employing Ga and As as the raw materials.

Figure 4:
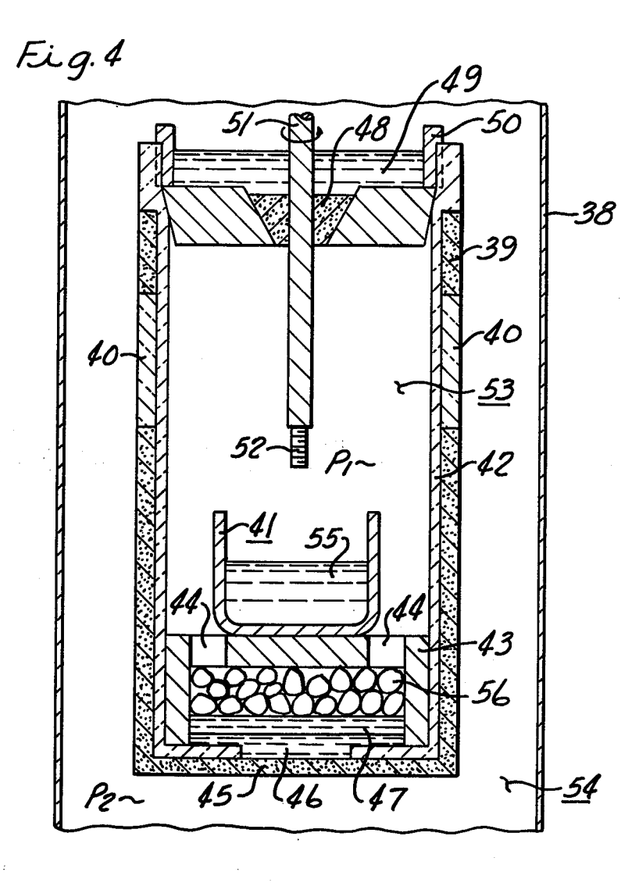
FIG. 4 is a diagrammatic view illustrating the vertical section of an apparatus for growing a single crystal of GaAs from a melt synthesized in situ, which is used for the practice of still another embodiment of this invention.

FIG. 4 is a diagrammatic view showing the vertical section of an apparatus for growing a single crystal of GaAs from a melt synthesized in situ, which is used in this Example.

In FIG. 4, an apparatus 39 composed of a porous material and provided with a window 40 is placed in a chamber 38 3 b 3 atmospheres). The interior of a melting crucible 41 can be observed through the window 40 and a pressure-resistant window (not shown). Reference numeral 42 indicates an inner vessel composed of transparent quartz, and a melting crucible stand 43 has slits 44. Reference numerals 45, 46 and 47 indicate a porous wall, a Ga layer and a $B_2O_3$ layer, respectively. A porous diffusion-barrier wall 48 and a $B_2O_3$ layer 49 are also provided at the upper part of the apparatus 39 and inner vessel 42, and they are fixed by means of a press ring 50. Reference numerals 51 and 52 indicate a pulling shaft and a seed crystal of GaAs, respectively.

As is illustrated in FIG. 4, the apparatus 39 is set in the outer chamber 38 together with Ga 55 and As 56. Then, as in Example 2, the pressure inside the chamber 38 is reduced to about $10^{-3}$ mmHg by evacuation, whereby the enclosed chamber 53 and outer chamber 54 are similarly evacuated with ease. Then, nitrogen gas is filled in the chamber 38 until the nitrogen pressure is 3 atmospheres in the chamber 38, whereby nitrogen gas is filled in the enclosed chamber 53 at a pressure of 3 atmospheres. Then, the melting crucible 41 is heated by a high temperature heater (not shown) and, Ga 55 and Ga 46 are at first made molten and then the $B_2O_3$ becomes fluid. Then, the temperature of the entire apparatus 39 is elevated above 610°C by means of an upper heater (not shown). It is preferred that the $B_2O_3$ layer 49 is heated to a temperature of at least 800°C at this heating step so that the $B_2O_3$ layer 49 has a good flowability. When the temperature of Ga 55 approximates 1250°C, As 56 is completely evaporated and is dissolved in Ga 55. At this time, the pressure $P_1$ in the enclosed chamber 53 is made equal to the pressure $P_2$ in the outer chamber, and the automatic pressure-balancing can be accomplished. The partial pressure of the arsenic vapor in the pressure $P_2$ is controlled to at the most 1 atmosphere. After a melt 55 of a desired composition is thus formed, according to the procedures of the ordinary Czochralski process, the seed crystal 52 is lowered, contacted with the melt 55 and pulled, whereby a single crystal of GaAs can be easily grown. In this Example, about 300 g. of a single crystal of GaAs can be obtained at a pulling rate of about 15 mm/hr. The apparatus 39 used in this Example is, of course, demountable and can be used repeatedly.

As illustrated hereinbefore, in this embodiment of the method of this invention, the melt (26 in FIG. 3 and 55 in FIG. 4) has no contact with the $B_2O_3$ layer (31 in FIG. 3 and 49 in FIG. 4) and the pressure-balancing is automatically established between the enclosed chamber and the outer chamber while maintaining the loss of the volatile component at a minimum level. Therefore, the operation can be greatly facilitated. Further, even when a crystal of an Al-containing compound such as AlAs, AlP and $Al_{1-x}In_xAs$ is prepared, since the melt has no contact with the $B_2O_3$, the preparation can be accomplished very easily according to this embodiment of this invention.

EXAMPLE 4

This Example illustrates an embodiment in which a single crystal of $GaAs_{1-x}P_x$ is prepared from Ga, As and P.

Figure 5:
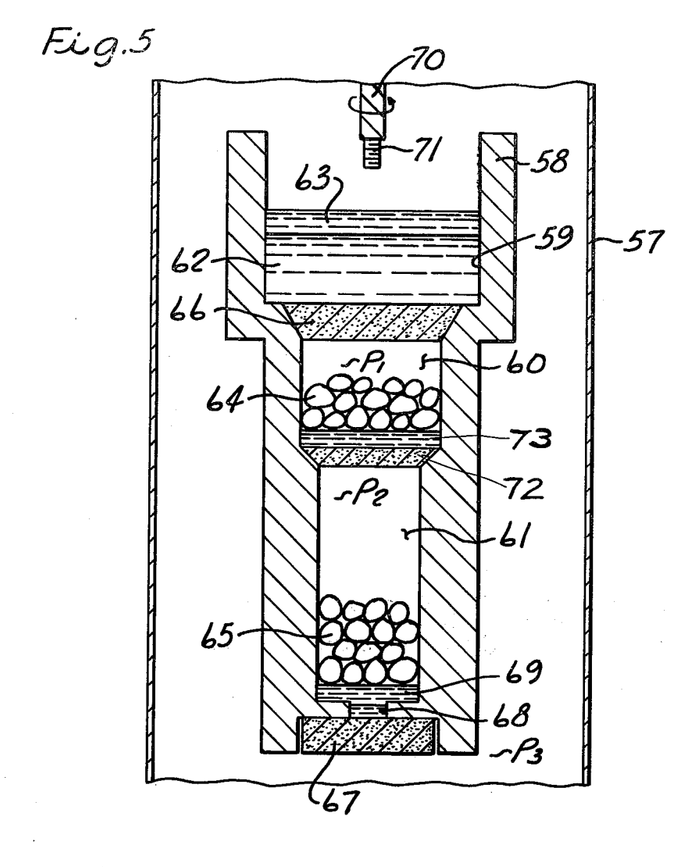
FIG. 5 is a diagrammatic view illustrating the vertical section of an apparatus for growing a single crystal of $GaAs_{1-x}P_x$ from a solution synthesized in situ, which is used for the practice of still another embodiment of this invention.

FIG. 5 is a diagrammatic view showing the vertical section of an apparatus for growing a single crystal of $GaAs_{1-x}P_x$ from a solution synthesized in situ, which is employed in this Example.

In FIG. 5, an apparatus 58 is placed in a high pressure chamber 57 (resisting 100 atmospheres) and the apparatus 58 includes a high temperature chamber 59, an intermediate temperature chamber 60 and a low temperature chamber 61. Ga 62 and a $B_2O_3$ disc 63 are contained in the high temperature chamber 59, and As 64 is charged in the intermediate temperature chamber 60. Further, P 65 is placed in the low temperature chamber 61. Reference numerals 66, 67 and 72 each indicate a porous solid, and reference numerals 68 and 69 indicate a Ga layer and a $B_2O_3$ layer, respectively. Reference numeral 73 also indicates a $B_2O_3$ layer. A seed crystal 71 of GaP is attached to a pulling shaft 70.

After the apparatus 58 is set in the chamber 57, the evacuation of the chamber 57 is at first effected until the pressure is reduced to about $10^{-3}$ mmHg, whereby the pressure $P_3$ in the outer chamber, the pressure $P_1$ in the space of the intermediate chamber and the pressure $P_2$ of the low temperature chamber is lowered to about $10^{-3}$ mmHg. Then, nitrogen is filled in the chamber 57 until the nitrogen pressure is about 10 atmospheres, whereby each of the pressures $P_1$, $P_2$ and $P_3$ is elevated to about 10 atmospheres.

Then, Ga 62 and $B_2O_3$ 63 in the high temperature chamber 59 and Ga 68 in the low temperature chamber 61 are made molten by means of a heater (not shown), whereby the upper portion and lower portion of the apparatus 58 are sealed by liquids 63 and 68, respectively. Then the $B_2O_3$ layer 69 is partially heated together with the low temperature chamber 61, whereby the $B_2O_3$ 69 is made molten and the pressure of the phosphorus vapor is elevated to about 8 atmospheres. At this time, the pressure $P_3$ is about 10 atmospheres (nitrogen gas), and each of the pressures $P_1$ and $P_2$ is about 10 atmospheres (8 atmospheres of the phosphorus vapor and about 2 atmospheres of nitrogen gas). Excessive nitrogen gas passes through the porous solid 66 and through the Ga liquid 62 and the $B_2O_3$ melt 63 while bubbling them, and is discharged into the chamber 57. Further, the $B_2O_3$ layer 73 is made molten by partial heating and the intermediate temperature chamber 60 is also heated, whereby the vapor pressure of the arsenic is controlled to about 0.2 atmosphere. At this point, the pressure $P_1$ includes about 0.2 atmosphere of the arsenic vapor, about 8 atmospheres of the phorphorus vapor and about 1.8 atmospheres of nitrogen gas, and the pressure $P_2$ includes about 8 atmospheres of the phosphorus vapor and about 2 atmospheres of nitrogen gas. Thus, each of the pressures $P_1$, $P_2$ and $P_3$ is kept at about 10 atmospheres. Vapors of phosphorus and arsenic are dissolved in the Ga, and in the high temperature chamber 59, a GaAs-GaP solution is formed containing about 60 mole % of GaAs and about 40 mole % of GaP. At this time, the temperature of the high temperature chamber 59 is controlled to about 1370°C. Then, the GaP seed crystal 71 attached to the pulling shaft 70 is immersed in the GaAs-GaP solution through the $B_2O_3$ layer 63 and pulled upwardly, whereby a mixed crystal of $GaAs_{1-x}P_x$ can be obtained. In this Example, when the pulling is effected at a rate of about 0.5 to about 5 mm/hr, a homogeneous mixed crystal of $GaAs_{0.35}P_{0.65}$ can be pulled. The diameter of the so obtained single crystal of $GaAs_{0.35}P_{0.65}$ is 10 to 20 mm, and its weight is 20 to 50 g. Of course, the apparatus 58 used in this Example is demountable and can be used repeatedly.

EXAMPLE 5

This Example illustrates an embodiment in which a single crystal of $GaAs_{1-x}P_x$ is prepared from a Ga-As-P solution containing Ga in an excessive amount.

Figure 6:
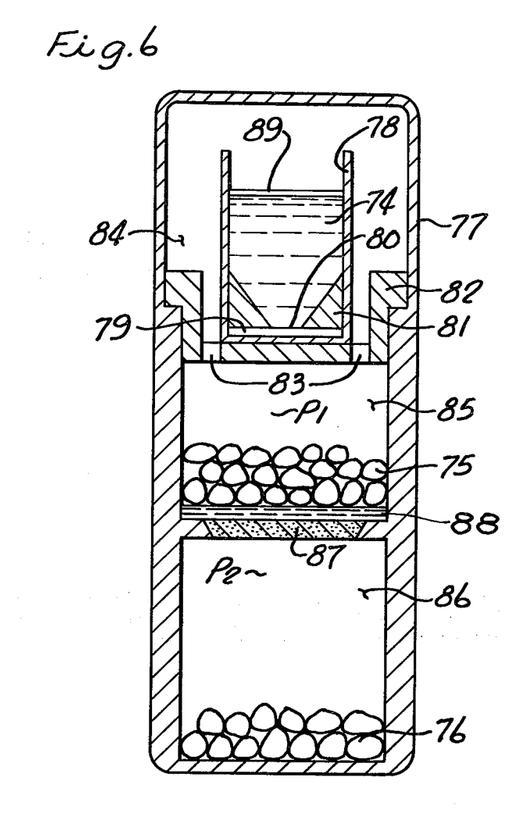
FIG. 6 is a diagrammatic view showing the vertical section of an apparatus for growing a single crystal of $GaAs_{1-x}P_x$, which is used for the practice of still another embodiment of this invention.

FIG. 6 is a diagrammatic view showing the vertical section of an apparatus for growing a single crystal of $GaAs_{1-x}P_x$, which is used in this Example.

Ga 74 containing suitable amounts of GaAs and GaP polycrystals, solid As 75 and P 76 (red phosphorus) are vacuum sealed in a quartz vessel 77. Ga 74, a single crystal substrate 79 of GaP or $GaAs_{0.6}P_{0.4}$ and a partition 81 having a slit 80 are placed in a melting crucible 78. A crucible stand 82 partitions a high temperature chamber 84 from an intermediate temperature chamber 85 and it has a slit 83. The intermediate temperature chamber 85 (acting as an enclosed chamber) is connected with a low temperature chamber 86 (acting as an outer chamber) through a diffusion-barrier wall composed of a porous wall 87 and a Ga melt 88.

The pressure of the phosphorus vapor is elevated to about 0.9 atmosphere by an external heater (not shown), and then the pressure of the arsenic vapor is controlled to about 0.7 atmosphere. Ga 74 in the high temperature chamber contains GaAs and GaP, and a temperature gradient of about 10° to 100°C/cm is formed so that the temperature is higher at a higher part and is lower at a lower part. In this state, the temperature of the Ga 74 is elevated while it is always saturated with GaAs and GaP. The surface temperature of the Ga solution is controlled to about 1100°C. At this point, the pressure $P_1$ includes about 0.7 atmosphere of the arsenic vapor and about 0.2 atmosphere of the phosphorus vapor, and the pressure $P_2$ is maintained at about 0.9 atmosphere by the phosphorus vapor. The temperature of the 0.9 88 is actually elevated to about 600°C. It may be considered that at such temperature arsenic or phosphorus has no substantial solubility in Ga. Under normal conditions, a thin layer 89 of $GaAs_{1-x}P_x$ is formed on the surface of the Ga solution 74, but it is diffused through the Ga solution by the above-mentioned temperature gradient and a single crystal of $GaAs_{1-x}P_x$ is grown on a substrate 79.

In this Example, it is possible to grow a single crystal of $GaAs_{0.6}P_{0.4}$ at a growth rate of about 50 to about 200 μm/hr.

As is seen from the foregoing explanation, in this embodiment a III–V mixed crystal represented by the formula $A^{III}B^V_{1-x}C^V_x$ can be grown from the molten solution while controlling the vapor pressure of the component $B^V$ and the vapor pressure of the $C^V$ component independently. Accordingly, this embodiment is suitable for producing not only $GaAs_{1-x}P_x$ as shown in this Example, but also $InAs_{1-x}P_x$ and other mixed crystals.

We claim:

1. A method for the thermal treatment of a semiconducting compound having at least one volatile component in an enclosed chamber having a diffusion-barrier wall separating the enclosed chamber from an outer chamber and which wall comprises a liquid layer on a porous wall wherein the liquid is selected from liquids having a low vapor pressure at the temperature of said diffusion-barrier wall and which are hardly capable of dissolving the volatile component therein and the liquid and the porous wall are exposed to the enclosed chamber and the outer chamber respectively, comprising the steps of introducing a gas under pressure into said outer chamber, heating the volatile component in the enclosed chamber to generate the vapor thereof under pressure, and balancing the vapor pressure in the enclosed chamber with the gas pressure in the outer chamber by diffusion thereof through said diffusion-barrier wall from said outer chamber into said enclosed chamber.

2. A method for growing a crystal of semiconducting compound having at least one volatile component by crystallizing it from a melt of said compound or a solution containing said compound, comprising the step of contacting said melt or solution with a vapor of said volatile component generated within an enclosed chamber, said method characterized by the steps of connecting the enclosed chamber with an outer chamber through a diffusion-barrier wall composed of a liquid layer on a porous wall wherein the liquid is selected from liquids having a low vapor pressure at the temperature of the diffusion-barrier wall and being hardly capable of dissolving said volatile component therein and with the liquid and the porous wall exposed to the enclosed chamber and the outer chamber respectively, introducing a gas under pressure of said vapor in said enclosed chamber with the gas under pressure in the outer chamber by diffusion thereof through said diffusion-barrier wall from said outer chamber into said enclosed chamber.

3. The method as set forth in claim 2 including the step of selecting an inert gas for the gas in said outer chamber.

4. The method as set forth in claim 3 including the step of maintaining the pressure of said inert gas higher than the vapor pressure of said volatile component.

5. The method as set forth in claim 4 including the step of diffusing said vapor through a second porous wall which is exposed to said enclosed chamber into said melt or solution which is covered with an overlying layer of a less dense inert liquid which is exposed to said outer chamber.

6. The method as set forth in claim 5 including the step of pulling a single product semiconducting crystal from said melt or solution through said layer of inert liquid.

7. The method as set forth in claim 5 including the step of selecting said semiconducting compound from the group consisting of GaAs, GaP, InAs, InP and mixtures thereof.

8. The method as set forth in claim 2 wherein said semiconducting compound is a III–V semiconducting compound.

9. The method as set forth in claim 2 wherein the step of generating said vapor is carried out between said diffusion-barrier wall and a second diffusion-barrier wall wherein the liquid and the porous wall thereof are exposed to said outer chamber and the enclosed chamber respectively.

10. The method as set forth in claim 2 characterized by selecting said semiconducting compound as a III–V mixed crystal represented by the formula $A^{III}_B V_{1-x} C^V_x$ in which $A^{III}$ is an element belonging to the Group III, $B^V$ and $C^V$ are different elements belonging to the Group V with the proviso that $C^V$ is more volatile than $B^V$ and $x$ is a number between 0 and 1, generating a vapor of the $C^V$ element in said outer chamber as the gas in said outer chamber, and generating a vapor of the $B^V$ element in the presence of said melt or solution in the inner enclosed chamber which is separated from said outer chamber by said diffusion-barrier wall such that the vapor pressure of the $C^V$ element is higher than the vapor pressure of the $B^V$ element.

11. An apparatus for the thermal treatment of a semiconducting compound having at least one volatile component comprising a container having an enclosed chamber for treatment of a volatile component therein of a semiconducting compound, heating means adapted to heat said enclosed chamber, said enclosed chamber connected to an outer chamber through at least one diffusion-barrier wall in said container comprising a liquid layer on top of a porous wall wherein the liquid and the porous wall are exposed to said enclosed chamber and said outer chamber respectively, said outer chamber being adapted to contain a gas therein under pressure and said liquid being selected from liquids having a low vapor pressure at the temperature to which said diffusion-barrier wall is subjected and which is hardly capable of dissolving therein the volatile component of a selected semiconductor compound to be treated.

12. The apparatus of claim 11 wherein said diffusion-barrier wall is characterized by a second coextensive porous wall over said liquid.

13. The apparatus of claim 11 wherein a second said diffusion-barrier wall is provided at an opposite end of said enclosed chamber from said first diffusion-barrier wall with said second diffusion-barrier wall having the liquid layer exposed to said outer chamber and the porous wall exposed to said enclosed chamber.

14. The apparatus of claim 13 wherein a third said diffusion-barrier wall is provided in said enclosed chamber intermediate said first and second diffusion-barrier walls thereby dividing said enclosed chamber into two parts.

15. The apparatus of claim 11 wherein said liquid is selected from one or more of the molten liquids consisting of $B_2O_3$, $BaF_2$, low melting point glass and Ga.

16. The apparatus of claim 11 wherein said porous wall is composed of a material selected from the group consisting of carbon, sintered BN, $Al_2O_3$ and porous quartz.

17. The apparatus of claim 11 wherein said liquid consists of a molten layer of $B_2O_3$ on top of a molten layer of Ga.

18. The apparatus of claim 11 wherein a second porous wall is provided which is exposed to said enclosed chamber as a bottom wall of a crucible which supports a melt or a solution containing the semiconducting compound itself to be treated covered with a layer of less dense inert liquid which is exposed to said outer chamber.

* * * * *

UNITED STATES PATENT OFFICE
CERTIFICATE OF CORRECTION

PATENT NO. : 3,902,860
DATED : September 2, 1975
INVENTOR(S) : Shin-ichi Akai; Katsunosuke Aoyagi;
Yasushi Hirata, all of Osaka, Japan It is certified that error appears in the above-identified patent and that said Letters Patent are hereby corrected as shown below:

After Line indication [21] on Title Page, insert

"[30]  Foreign Application Priority Data
Sept. 28, 1972   Japan . . . . 97,315/1972
Aug.   1, 1973   Japan . . . . 86,543/1973
Aug.   4, 1973   Japan . . . . 87,931/1973    "

Col. 3, line 30, erase "by" and substitute --but--

Col. 7, line 56, erase "3 b" and substitute --(resisting--

Col. 10, line 23, erase "0.9" and substitute --Ga--

Col. 11, line 10, after "under pressure" insert
--into said outer chamber, and balancing
the vapor pressure--

Col. 11, line 46, erase "$A^{III}B^V_{1-x}C^V_x$" and substitute
--$A^{III}B^V_{1-x}C^V_x$--

Signed and Sealed this

Twentieth Day of July 1976

[SEAL]

Attest:

RUTH C. MASON
*Attesting Officer*

C. MARSHALL DANN
*Commissioner of Patents and Trademarks*